United States Patent Office 2,759,354
Patented Aug. 21, 1956

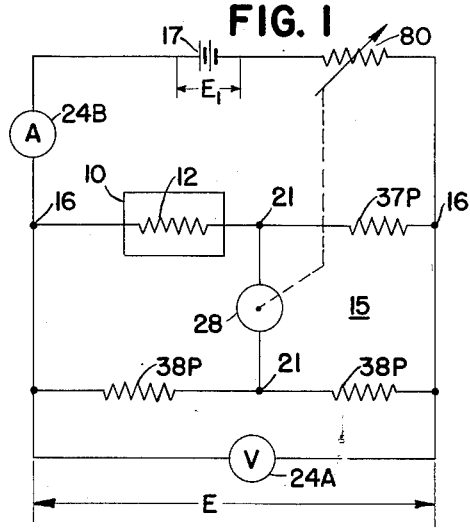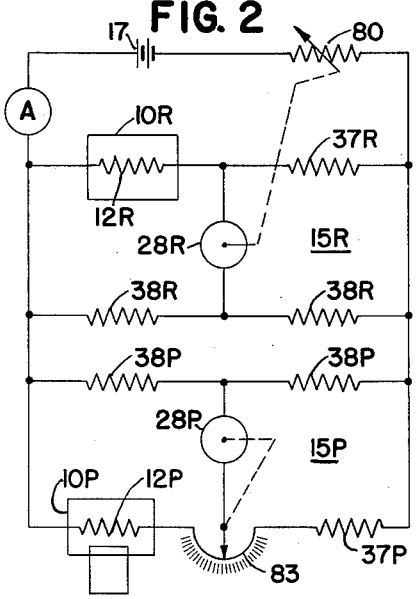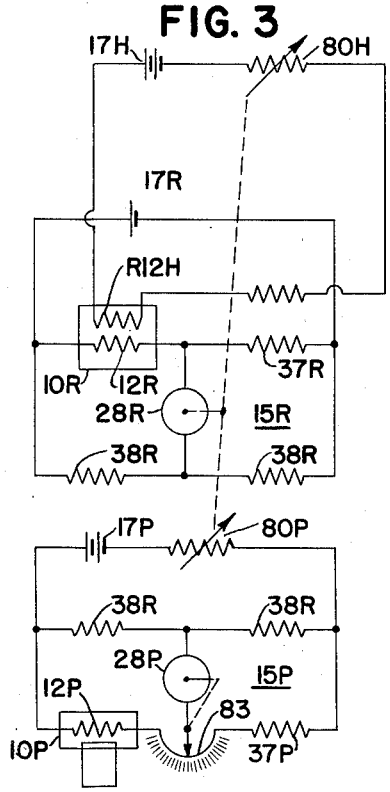

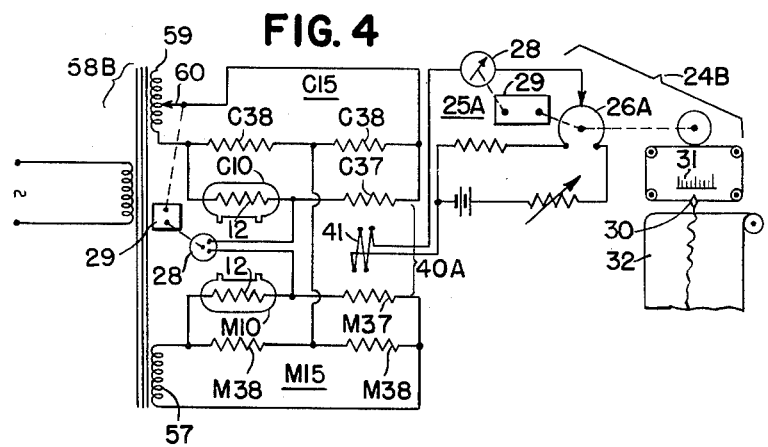
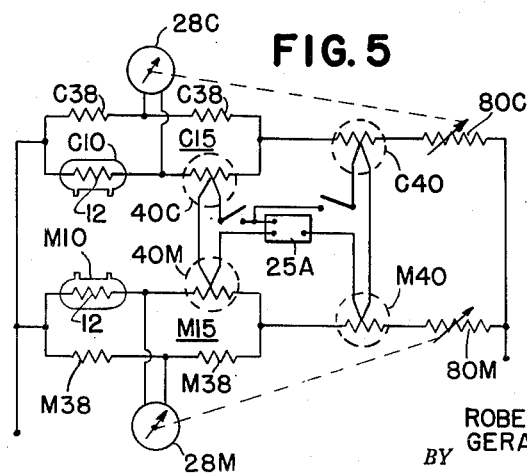
INVENTORS
ROBERT H. CHERRY
GERARD M. FOLEY
BY
ATTORNEYS

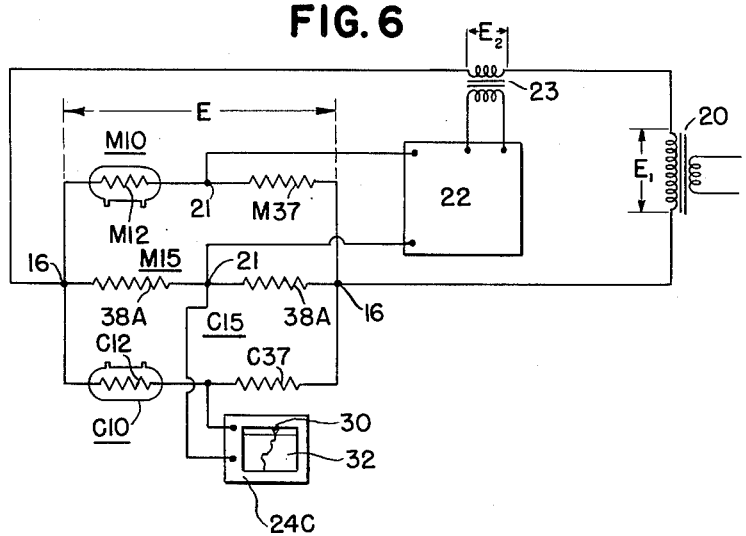
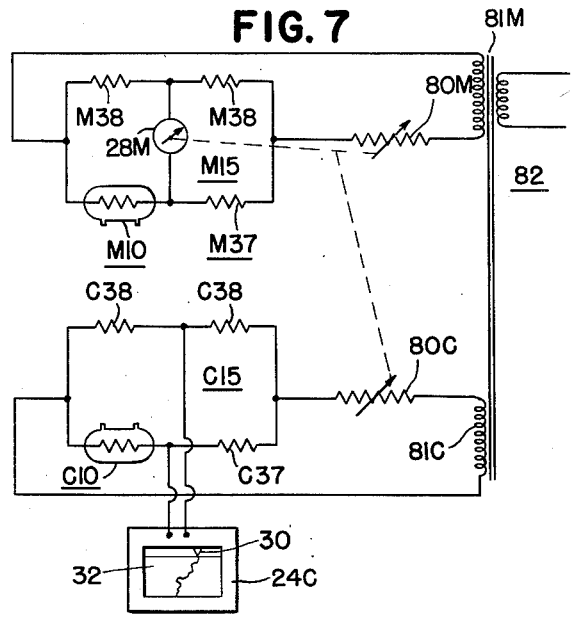

2,759,354

ISOTHERMAL SYSTEMS FOR GAS ANALYSIS

Robert H. Cherry, Ambler, and Gerard M. Foley, North Hills, Pa., assignors to Leeds and Northrup Company, Philadelphia, Pa., a corporation of Pennsylvania Application September 26, 1950, Serial No. 186,832

12 Claims. (Cl. 73—27)

This invention relates to electrical systems for gas analysis.

It has heretofore been a common practice in the art of gas analysis to determine the composition or changes in composition of a gas affecting a particular characteristic of the gas by passing it through an analysis cell in which the gas is in thermal transfer relation to an electrically-heated temperature-sensitive resistor; the changes in equilibrium temperature or resistance of the resistor are interpreted in terms of the gas composition. However, systems devised for such practice are not suited for accurate analysis when the gas is subject to rapid or large changes in composition because reestablishment of thermal equilibrium of the resistor after a change in gas composition is substantially delayed by the thermal inertia of the resistor and because of danger of damage or burnout of the resistor when there is substantial reduction in thermal loss due to the gas. Furthermore, in such systems, the limited compensation of unavoidably present variables, such as ambient temperature, stability of power source, and changes in gas composition affecting characteristics not of interest, greatly restricted the fields of application of such systems.

For example, it has been common practice in determination of the concentration of combustibles in a gas to combust it in close proximity to an electrically heated resistor of an analysis cell and to interpret the change in equilibrium temperature or resistance of the resistor in terms of change in concentration of the combustibles in the gas. In apparatus devised for this practice, the heat liberated by combustion may be very great with consequent danger of resistor burnout and the corresponding great temperature change of the resistor requires a relatively long time before thermal equilibrium is restored.

In accordance with one aspect of the present invention, the heat supplied to an element in thermally dissipative relation to the gas to be analyzed, or to a reference gas, or both, is varied with change in physical characteristics of the gas which affect its thermal properties to restore the temperature of the heated element to its original value relative to a reference temperature whereby the variation in heat input is a measure of change in composition of gas being analyzed or is for elimination of the effects of common variables to which the reference and sample gases are subject.

More specifically, in accordance with such aspect of the present invention, the gas to be analyzed is in proximity to an electrically heated resistor whose temperature is maintained at a constant magnitude, or at a constant difference with respect to a reference, and the change in electrical input necessary to obtain such isothermal operation of the resistor is utilized as a measure of the change in gas composition or to eliminate from a measurement of a particular characteristic the effect of unavoidable variables. Since the resistance of the gas analysis cell is maintained at substantially constant temperature, only a relatively short time is required to reestablish its thermal equilibrium after a change in gas composition: moreover, the reduction in electrical input to the resistor of the cell which is effected upon substantial reduction in thermal loss due to the gas, as by reduction of thermal conductivity of the gas, or upon large release of heat by its combustion, prevents damage to or burnout of the cell resistor. Thus, our systems and arrangements providing for substantially isothermal operation of the heated resistors of gas analysis cells are particularly suited for accurate measurement of both rapid and large changes in gas composition and despite changes in other variables which in absence of the invention would seriously impair accuracy of measurement.

More particularly in accordance with the invention, the gas analysis system is provided with means responsive to small temperature deviations of the cell resistor and suited to vary the electrical input the resistor so to reduce the temperature deviation to negligible magnitude: in some forms of the invention, there may also be provided means suitably calibrated in terms of gas composition for indicating or recording the variable input power to the resistor.

More specifically, and in some forms of the invention, the analysis cell and/or the reference cell is included in an alternating-current balanceable network whose unbalance is amplified by a thermionic amplifier and then algebraically added to the normal input to the resistor as supplied by a voltage source. In other forms of the invention, the unbalance of the cell-network may control an electromechanical relay system which adjusts a variable impedance, or equivalent input control device, interposed between the cell resistor and a voltage source of input therefor. In all forms, a means responsive to the changes in input positions an exhibiting element calibrated in terms of gas composition.

In the systems herein claimed, the analysis and reference cells are respectively disposed in balanceable bridge networks, the heat input to one or both of which is controlled in response to unbalance of at least one of the networks to effect isothermal operation. Specifically in some of these systems, the heat input to one bridge is varied in response to the combined unbalances of both bridges and the exhibiting means is repositioned in accordance with the difference in heat inputs to both bridges. In other systems, the heat input to the respective bridges is varied in response to the unbalances of the individual bridges and the exhibiting means is repositioned in accordance with the difference in heat input to both bridges. In other forms, the heat input to both bridges is varied in response to unbalance of one of the bridges and the exhibiting means is repositioned in accordance with the unbalance of the other bridge. In general all of these systems have two responsive means, one for effecting adjustment of current-varying means in the bridge supply and the other for effecting repositioning of the exhibiting means; one of the responsive means responds to unbalance of at least one of the bridges and the other of the responsive means responds to changes of the heating currents of both bridges.

The invention further resides in gas analysis methods and systems, having the features of novelty and utility hereinafter described and claimed,.

For a more detailed understanding of the invention and for illustration of various systems embodying it, reference is made to the accompanying drawings, in which:

Fig. 1 schematically illustrates a gas analysis system in which the electrical input to the gas analysis cell is varied to provide isothermal operation and is meausred to determine gas composition;

Figs. 2 to 7 schematically illustrate various gas analysis systems having analysis and reference cells in bridge networks with provision for isothermal operation of either or both cells.

Referring to Fig. 1, the gas analysis cell 10 comprises an envelope 11 in which is housed a resistor element 12 having a substantial temperature coefficient of resistance. Tubes from the envelope 11 communicate with a pipe through which flows the gas to be analyzed. A sample or sidestream of the gas thus flows through the gas analysis cell 10 in heat transfer relationship with the resistor 12. For more detailed description of the cell, reference may be had to issued patents including Fredericks No. 2,045,640.

The resistor element 12 of the gas analysis cell 10 is included in a balanceable electrical network 15, specifically a Wheatstone bridge, having input terminals 16, 16 connected to a suitable current source 17. Detector 28 responds to the unbalance voltage appearing between output terminals 21, 21 of network 15 upon change in composition of the gas to effect adjustment of rheostat 80, or equivalent, in circuit between the source 17 and network 15. Thus, substantially immediately upon change in the gas composition, the electrical input to the gas analysis cell 10, or equivalent cell, is varied to return the temperature of resistor 12 to its original value.

As will now be shown, the change in electrical input required to maintain the temperature of resistor 12 constant is a direct measure of the change in gas composition.

The gas cell is in thermal equilibrium when the heat losses therein are equal to the heat input. If the cell wire has a resistance $R_1$ at temperature $\theta_1$ and has a temperature coefficient of resistance $\alpha$, then its resistance $R_2$ at a higher temperature $\theta_2$ may be expressed as:

(1)  $\quad R_2 = R_1 + \alpha R_1(\theta_2 - \theta_1) = R_1 + \alpha R_1 \Delta\theta$ or (2)  $\quad \Delta\theta = \dfrac{R_2 - R_1}{\alpha R_1}$ For a cell wherein the major loss of heat is due to thermal conduction through the gas, the temperature difference, $\Delta\theta$, between the heated wire and the wall of a gas analysis cell may be expressed as:

(3)  $\quad \Delta\theta = (\theta_2 - \theta_1) = \dfrac{I^2 R_2 D}{K}$ where $I$ = current through cell resistor
$\theta_2$ = temperature of cell resistor
$R_2$ = resistance of cell resistor at $\theta_2$
$D$ = dimensional constant of cell
$\theta_1$ = temperature of cell wall
$K$ = thermal conductivity of gas in cell Substituting this value of $\Delta\theta$ in Equation 1 and solving for $R_2$:

(4)  $\quad R_2 = \dfrac{R_1 K}{K - \alpha R_1 I^2 D}$

It thus appears that the resistance of the heated wire 12 of cell 10 is a function of the thermal conductivity of the gas and since the unbalance voltage of network 15 is a function of resistance of wire 12, the latter is also a function of the thermal conductivity of the gas.

In Fig. 1 above described, as well as in all modifications subsequently described, isothermal operation of the system is obtained by utilizing the unbalance of network 15, or its equivalent, to adjust the supply voltage $E$ applied to the bridge upon change in composition of the gas. As now shown, this variable voltage $E$ is a function of the thermal conductivity of the gas.

In Fig. 1, the current traversing the analysis cell is:

(5)  $\quad I = \dfrac{E}{R_2 + S}$ where $S$ = resistance of resistor 37P.

Solving Equation 4 for $I$, the cell current, it appears that:

(6)  $\quad I^2 = K\left(\dfrac{R_2 - R_1}{\alpha R_1 R_2 D}\right)$

Substituting this value of $I$ in Equation 5 and solving the equation for $E$:

(7)  $\quad E = \sqrt{K}(R_2 + S)\sqrt{\dfrac{R_2 - R_1}{\alpha R_1 R_2 D}}$

Since for isothermal operation, all terms in the right-hand side of Equation 7 are constants with the exception of $K$, it follows that the variable input to network 15 is a function of the thermal conductivity of the gas traversing cell 10. Similarly, it can be shown that for isothermal operation, the current or power to the bridge 15, or to the cell resistor 12, is a function of the thermal conductivity of the gas and thus devices for measuring those variables, or adjusting them for a balance of the bridge, can be calibrated directly to read in terms of gas composition. In like manner, it can be shown that the power input, for isothermal operation, is a function of some other selected thermal loss characteristic such as convection loss in paramagnetic analysis cell or heat liberation in a combustion analysis cell.

As above pointed out, since the temperature of resistor 12 is maintained constant, immediately upon a change in gas composition, the input to the bridge is varied in sense and extent required to restore the temperature of the resistor to its original value and consequently there is no substantial delay in measurement because of thermal inertia of the resistor. Furthermore, for large changes in the selected thermal loss characteristic of the gas, there is no corresponding large change in temperature of the resistor and consequently there is no danger of damage or burnout as in prior arrangements.

For paramagnetic analysis, the cell 10 of Fig. 1 may be of the type disclosed and claimed in our copending application Serial No. 84,614 upon which has issued U. S. Letters Patent 2,603,964. In such case, ammeter 24B responsive to the current supplied to the bridge, a voltmeter 24A for measuring the voltage $E$ applied to the bridge, a wattmeter (not shown) for measuring the power input to the bridge, or rheostat 80 for adjusting these variables, may be calibrated to read in terms of the concentration of the paramagnetic component of the gas.

For effecting rebalancing adjustment of rheostat 80 in response to unbalance of bridge 15, the responsive device 28 may be of the type shown in Squibb Patent 1,935,732 in which a galvanometer effects adjustment of a rebalancing slidewire through a mechanical relay mechanism.

With the simple arrangement shown in Fig. 1, errors may arise because of changes in pressure of the gas, changes in its viscosity, changes in composition of the vehicle gas, or of other variables unrelated to the paramagnetic concentration. To compensate for such errors, a bridge corresponding with bridge 15 of Fig. 1 is connected in circuit with a second bridge, either in parallel, as shown in Fig. 2, or in series, with respect to source 17. More specifically in Fig. 2 (original Fig. 11 of our aforesaid application Serial No. 84,614), a reference cell 10R is included in a second bridge 15R provided with a detector 28R which in response to unbalance of that bridge adjusts the rheostat 80, or equivalent, to vary the input to the bridge in sense and to extent restoring the temperature of resistor 12R of cell 10R to normal value. The change in setting of rheostat 80 also concurrently varies the input to bridge 15P including in one of its arms the analysis cell 10P which receives the gas undergoing analysis. For each magnitude of current input to bridge 15P, or for each magnitude of voltage drop across its terminals, as determined by the setting of rheostat 80, there is a definite relation between the concentration of the paramagnetic component of the gas in cell 10P and the unbalance of bridge 15P. Accordingly, the concentration may be accurately determined despite, for example, variations in ambient temperature or in composition of the vehicle gas. The unbalance of bridge 15P may be measured in any of various manners herein disclosed. Specifically, in Fig. 2, the deviation from the point of normal balance at a known concentration may be read from the setting of rebalancing slidewire 83, or from a pointer or marker concurrently re-positioned by the responsive device 28P.

The parallel bridge arrangement of Fig. 2 may be simplified by converting it from two four-arm bridges to a six-arm network (as in Fig. 6) in which the left-hand resistors 38P, 38R of Fig. 2 are replaced by a single resistor common to bridges 15R, 15P and in which the right-hand resistors 38P, 38R are similarly replaced by a single resistor forming another common arm.

To obtain the compensation attainable with the arrangement shown in Fig. 2, it is not necessary that both bridges be supplied from a common source. For example, the bridges may be supplied from separate sources, each with an input control element for the associated bridge, and the two control elements may be coupled for concurrent adjustment to similar or dissimilar extents. Furthermore, although the temperature-sensitive resistor of the reference cell may be self-heated, it may be heated from a separate heater element. In Fig. 3 (original Fig. 12 of our aforesaid application Serial No. 84,614), both of these modifications of Fig. 2 are incorporated. The bridges 15P and 15R are supplied from independent current sources 17P, 17R and isothermal operation of bridge 15R is obtained under control of responsive device 28R by varying the heat input to reference cell 10R. Specifically, the change in heat input to cell 10R is effected by adjustment of rheostat 80H in circuit with the supply source 17H for heater R12H of reference cell 10R. Concurrently with adjustment of the heat input to cell 10R of bridge 15R, the responsive device 28R resets the rheostate 80P in circuit with the supply source 17P of bridge 15P to change the heat input to analysis cell 10P of bridge 15P. As in Fig. 2, the detector 28P responsive to unbalance of bridge 15P effects a rebalancing adjustment of slidewire 83 associated with indicating or recording means calibrated in terms of concentration of a paramagnetic component of the gas.

In many cases the gases to be analyzed are of corrosive nature and in time would so affect the resistance of the cell resistors that replacement or recalibration would be necessary. In such cases, the resistance wire may be coated or enclosed in a sheath of insulating material, such as glass having a suitable coefficient of thermal expansion and resistant to the corrosive action of the gas. The thickness of the coating is actually very small, of the order of a few thousandths of an inch, so that its interposition between the resistor wire and the gas has negligible effect on the heat transfer relation.

When the resistor element of the analysis cell is to respond to combustion of the gas, its sheath may be coated with a catalyst for promoting combustion. Specifically, the protective sheath of the resistance wire is in turn covered with a catalytic coating which may be produced thereon by evaporation of the desired material in a vacuum or by reduction of a salt of the desired metal using the technique employed in silvering mirrors or in applying platinum, gold and the like to decorative glassware and china.

In the subsequently described modifications like those of Figs. 2 and 3, the measuring system, in addition to the analysis cell, includes a reference cell. The temperature of the temperature-sensitive resistor of the analysis cell varies as a function of all variables, including one to be measured, affecting the heat losses from the resistor, whereas the temperature of the temperature-sensitive resistor of the reference cell varies as a function of the same variables except the one to be measured. The two cells similarly respond to the variables to be eliminated from the measurement and the means provided for response of the analyzer cell to the desired variable will vary; for example, for measurement of the concentration of oxygen or other paramagnetic component of a gas, the heater of the analyzer cell is subjected to a magnetic field, whereas for measurement of concentration of combustibles in a gas, the analyzer cell contains a catalyst promoting combustion.

In the arrangement shown in Fig. 4, each of the two cells C10, M10 is individually associated with a balanceable network supplied from a separate source of voltage. Specifically, the reference cell M10 is included in a Wheatstone bridge M15 comprising the resistor M37 in series with the combined heater element and temperature-sensitive resistor 12 of the cell M10 across a voltage supplied by secondary winding 57 of transformer 58B. The combustion or analysis cell C10 is in a network C15, also of the Wheatstone bridge type including a resistor C37 in series with the combined heater and temperature-sensitive resistor 12 of cell C10 across that variable portion of the secondary winding 59 of transformer 58B selected by the position of contact 60. The other two arms of the bridge C15 are formed by the resistors C38, C38. The adjustment of contact 60 is effected by mechanism 29 which is controlled by galvanometer 28 or other responsive device. The galvanometer 28 responds to the difference between the unbalance outputs of the two bridges C15 and M15 to readjust the voltage applied to the network C15 by a rebalancing adjustment of contact 60, thus automatically to maintain the temperature of the heater resistor 12 of the combustion cell C10 at constant temperature relative to the corresponding heater of cell M10. The difference between the input power supplied to the networks C15, M15 may be measured in any suitable manner by apparatus calibrated in terms of combustible component of the gas. Specifically, the resistors C37 and M37 respectively in series with the combustion cell and reference cell are in heat transfer relation to thermocouples 41 so that the output voltage of the thermocouples varies with change in the difference in input power to the two cells. The direct-current output voltage of the differential thermocouple may be measured by a direct-current potentiometer 25A of an indicator recorder instrument 24B calibrated in terms of combustible components of the test gas. Specifically, the indicating-recording element 30 is re-positioned with respect to scale 31 and chart 32 concurrently with rebalancing adjustment of potentiometer slidewire 26A by means of galvanometer 28 and the associated relay mechanism 29.

In the system of Fig. 5, like that of Figs. 2–4, the reference and analysis cells are in separate networks. In Fig. 5, however, unbalance of each network effects change of heat input to that network individually to effect isothermal operation of both networks. Specifically, as shown in Fig. 5, the detector 28C in response to unbalance of network C15 including the analysis cell C10 effects adjustment of resistor 80C, or equivalent input control means, to maintain the combined heater and temperature-sensitive resistor 12 of cell C10 at a predetermined fixed temperature: the detector 28M in response to unbalance of network M15 including the reference cell M10 effects adjustment of resistor 80M, or equivalent, to maintain the combined heater and temperature-sensitive resistor 12 of cell M10 at predetermined fixed temperature. (It shall be understood that any of the other herein described arrangements for adjusting the heat input may be used.)

The difference between the heat inputs to the two networks can be measured by thermal converters 40C, 40M whose heaters are respectively included in the networks and whose differential output is measured in a bridge or potentiometer network exemplified by block 25A and having an associated indicating or recording means. Alternatively, the difference between the heat inputs of the two networks may be measured by thermal converters C40, M40 whose heaters are respectively in the power input circuits of the respective networks C15, M15. In either case, the thermal converters may be of the thermocouple type as in Fig. 5, or of the resistance-thermometer type having temperature-sensitive resistors which are in adjacent arms of a measuring bridge network and which are in heat-exchange relation to the heaters 40C, 40M or C40, M40.

Assuming the gas under analysis traverses both cells, the heat input to network C15 varies as a function of all variables affecting the heat losses from the heater resistor, including the one to be measured, whereas the heat input to network M15 varies as a function of those same variables except the one to which cell C10 selectively responds. Hence the difference in heat inputs to the networks is an accurate measure of the selected characteristic of the gas and is independent of substantial changes in line voltage. In this modification, as well as in others using a reference cell, the nature of the process monitored by the measuring system may in some cases require that the reference gas be of fixed composition in which case a sample may be isolated in the reference cell, whereas in other cases and as above described the composition of the reference gas varies with the composition of the gas being analyzed.

In discussion of Figs. 4 and 5, the selected characteristic of the gas under analysis was its combustibility in presence of a chosen catalyst. The same measuring networks for utilization of isothermal operation of either or both the reference and analyzing cells may be employed for other selected characteristics: for example, they may be used in determination of oxygen or other paramagnetic component of a gas. In such, the reference and analyzer cells are similar except that the temperature-sensitive resistor of the analyzer cell is in a non-homogeneous magnetic field as in copending U. S. applications, Serial Nos. 84,614 and 85,164 which have issued as U. S. Letters Patent 2,603,964 and 2,603,965 respectively.

As therein more fully discussed, the magnetic field affects paramagnetic components of the gas to vary heat losses of the heater by convection currents in amount varying with the concentration of such components.

In the arrangement shown in Fig. 6, like those of original Figs. 11 and 12 of aforesaid copending application, Serial No. 84,614, and reproduced herein as Figs. 2 and 3, the gas analysis system includes two networks respectively including the reference and analysis cells. The unbalance of one of the networks is utilized to change the input to that network for isothermal operation of its cell and concurrently to change the input to the other network whose unbalance is a measure of the selected characteristic.

The temperature-sensitive resistors M12, C12 of the cells are heated by current supplied from power transformer 20. The unbalance voltage appearing between output terminals 21, 21 of network M15 is impressed upon the input terminals of a high-gain amplifier 22 whose output is injected, as by coupling transformer 23, into the power supply circuit. Specifically, the variable output voltage $E_2$ of amplifier 22 is algebraically added to output voltage $E_1$ of power transformer 20 to provide the input voltage $E$ applied to the input terminals 16, 16 of the dual bridge network M15, C15.

Assuming in Fig. 6, that cell C10 is a thermomagnetic cell, preferably of type shown in aforesaid application, the cell M10 has similar thermal characteristics but has no provision for response to paramagnetic properties of the gas. The unbalance of the network including cell M10 is utilized as through feedback amplifier 22 to adjust the heat input to both networks, the input to the network including cell M10 being varied to maintain isothermal operation of that cell and to provide the other network with an input which, in absence of paramagnetic properties of the gas, would afford isothermal operation of cell C10. Hence, the unbalance of the network including C10 is a measure of the concentration of the paramagnetic components of the gas to the exclusion of other thermal loss properties of the gas, and of other variables such as ambient temperature and supply line voltage.

When it is not feasible or convenient to provide cells C10, M10 of similar thermal characteristics, recourse may be had to the generically similar arrangement of Fig. 7 in which the two networks are supplied from separate sources, exemplified by the secondary windings 81C, 81M of transformer 82. The resistors 80C, 80M, or equivalent, in circuit respectively with the networks and their separate supply sources are concurrently adjusted by a detector 28M responsive to unbalance of the network including cell M10. Thus, as in Fig. 6, the unbalance of the other network including cell C10 is a measure solely of the paramagnetic properties of the gas and may be recorded or indicated on an instrument 24C calibrated in terms of such property.

The arrangements of Figs. 6 and 7 may be used for other types of gas analysis: in combustion analysis, it is desirable that cell M10 be used as the combustion or analysis cell because isothermal operation thereof protects the cell and eliminates effect of its thermal inertia upon the measurement. In such arrangement, the unbalance of the network which includes the reference cell C10 is a measure of the combustibles in the gas and may be recorded on a suitably calibrated instrument. In general and in all of Figs. 2, 3, 4, 6 and 7, for protection of both cells from excessive temperature, the isothermal network should include that cell which reduces input to both networks upon increase of the gas component which reduces heat losses from the cell resistor. In Fig. 5, as above stated, both networks are maintained in isothermal condition and consequently their respective temperature-sensitive cells are protected from excessive temperatures for widely varying concentrations of the measured component of the gas and for widely varying background composition of the gas.

It shall be understood the invention is not limited to the isothermal gas analysis arrangements herein described but includes other arrangements comprehended by the claims.

What is claimed is:

1. An electrical gas-analysis system comprising a reference cell and an analysis cell traversed by gas to be analyzed, said analysis cell including a temperature-sensitive electrically-heated resistor sensitized to a characteristic of a selected component of the gas and to ambient conditions, said reference cell including a temperature-sensitive electrically-heated resistor sensitive only to said ambient conditions, balanceable networks respectively including said resistors, means for supplying heating current for said resistors including adjustable means suited for concurrent variation of said current for both networks, rebalancing means responsive to unbalance of at least one of said networks for effecting operation of said adjustable means, indicating means calibrated in terms of said selected component, and means responsive to adjustment of said current-varying means including means for actuating said indicating means.

2. A gas-analysis system as in claim 1 in which the means responsive to adjustment of the current-varying means comprises thermal converter means having resistance means traversed by current for said resistors and having thermocouple means associated with said resistance means, and indicating means responsive to the output of said thermocouple means.

3. A gas-analysis system as in claim 1 in which the analysis cell is provided with means for effecting combustion of the gas in proximity to said resistor of that cell and in which the network including said resistor is restored to balance by said adjustment of said adjustable means.

4. A gas-analysis system as in claim 1 in which said rebalancing means effects rebalancing of both networks, and in which the last-named responsive means is responsive to the difference between the heating currents for said networks.

5. An electrical gas-analysis system comprising an analysis cell including an electrically-heated resistor sensitive to a characteristic of one component of the gas to be analyzed and to ambient conditions, a reference cell including an electrically-heated resistor sensitive only to said ambient conditions, supply means for supplying heating current for said resistors, two bridge networks respectively including said analysis and reference cells, responsive means connected to respond to changes in the potential difference of the output terminals of one of said bridges and cooperating with said supply means to vary the heating currents for said resistors of the bridge networks each to extent corresponding with said changes in potential difference, and indicating means connected to respond to changes in the output of the other of said bridge networks and calibrated in terms of said component of the gas.

6. A gas-analysis system as in claim 5 in which the responsive means is an amplifier upon whose input circuit is impressed said changes in output potential difference of said one of the bridges and whose output is applied to effect said variation of heating current.

7. An electrical gas-analysis system for measuring a selected component of a gas comprising an analysis cell and a reference cell traversed by the gas, said analysis cell including an electrically-heated temperature-sensitive resistor sensitized to a characteristic of said selected component and to ambient conditions, said reference cell including an electrically-heated temperature-sensitive resistor sensitive only to said ambient conditions, balanceable networks respectively including said resistors, means for supplying heating current for said resistors of said networks including means adjustable concurrently to vary said current for both networks, means responsive to the unbalance of one of said networks for effecting operation of said adjustable means to vary the current for the resistors of both said networks each to extent corresponding with unbalance of said one of said networks and to restore to balance said one of said networks, and means calibrated in terms of said selected component of the gas responsive to unbalance of the other of said networks resulting from aforesaid operation of said adjustable means.

8. A gas-analysis system as in claim 7 in which said unbalance responsive means for said other of the networks effects rebalancing of said other network and is connected to an element of an indicating means to reposition it during rebalancing of said other of the networks.

9. A gas-analysis system as in claim 7 in which the temperature-sensitive resistors of each of the networks have individual heating current supply means, and in which means responsive to unbalance of said one of said networks concurrently varies the heating currents for said temperature-sensitive resistors of the networks from their said individual supply means.

10. An electrical gas-analysis system comprising a reference cell and an analysis cell traversed by gas to be analyzed, said analysis cell including a temperature-sensitive electrically-heated resistor sensitized to a characteristic of a selected component of the gas and to ambient conditions, said reference cell including a temperature-sensitive electrically-heated resistor sensitive only to said ambient conditions, bridge networks respectively including said resistors, means for supplying heating current for the resistors and including adjustable current-varying means, indicating means calibrated in terms of the selected component, responsive means for effecting adjustment of said current-varying means, and responsive means for effecting positioning of said indicating means, one of said responsive means responding to unbalance of at least one of said bridges and the other of said responsive means responding to changes of the heating current to both bridges.

11. A gas-analysis system as in claim 10 in which the responsive means for effecting adjustment of the current-varying means is responsive to the combined output of both bridges, and in which the responsive means for effecting positioning of the indicating means is responsive to the combined input of both bridges.

12. A gas analysis system as in claim 1 in which the temperature-sensitive resistor of the analysis cell is sensitized to the paramagnetic characteristic of a selected component of the gas including means for subjecting the gas heated by that resistor to a non-homogeneous magnetic field for producing convection currents which vary the heat losses of that resistor by amount varying with the concentration of the paramagnetic component.

References Cited in the file of this patent

UNITED STATES PATENTS

| | | |
|---|---|---|
| 1,156,660 | Berg | Oct. 12, 1915 |
| 1,222,492 | Thomas | Apr. 10, 1917 |
| 1,691,600 | Brush et al. | Nov. 13, 1928 |
| 1,707,624 | Brown | Apr. 2, 1929 |
| 2,437,449 | Ames et al. | Mar. 9, 1948 |
| 2,552,017 | Schwartz et al. | May 8, 1951 |
| 2,596,992 | Fleming | May 20, 1952 |

FOREIGN PATENTS

| | | |
|---|---|---|
| 250,478 | Great Britain | Apr. 15, 1926 |